United States Patent

[11] 3,601,584

[72] Inventor Toshio Kashio
Tokyo, Japan

[21] Appl. No. 723,484
[22] Filed Apr. 23, 1968
[45] Patented Aug. 24, 1971
[73] Assignee Casio Computer Co., Ltd.
Tokyo, Japan
[32] Priority May 15, 1967, May 16, 1967, May 18, 1967, May 24, 1967
[33] Japan
[31] 42/30,395, 42/40,318, 42/41,170 and 42/32,537

[54] A DEVICE FOR READING PUNCHED CARDS
3 Claims, 19 Drawing Figs.

[52] U.S. Cl. 235/61.11E, 250/219 DC
[51] Int. Cl. G06k 7/016
[50] Field of Search 235/61.115, 61.11, 61.114, 61.115 CR; 250/219 ID; 178/69, 69.5, 70

[56] References Cited

UNITED STATES PATENTS

| | | | |
|---|---|---|---|
| 3,287,543 | 11/1966 | Halpern | 235/61.11 |
| 3,424,913 | 1/1969 | Hesse | 235/61.11 |
| 3,463,930 | 8/1969 | West | 235/61.11 |
| 2,907,989 | 10/1959 | Guerber | 235/61.114 |

*Primary Examiner*—Thomas A. Robinson
*Attorney*—Sughrue, Rothwell, Mion, Zinn & Macpeak

ABSTRACT: A programming system for an electronic computer using a card-reading device, said reading device having a card passageway adapted to feed punched cards by allowing descent of the card therethrough by gravitation. The information stored in each punched card is read by a photoelectric means while each punched card descends by gravity through the card passageway of the card-reading device.

FIG·1-A
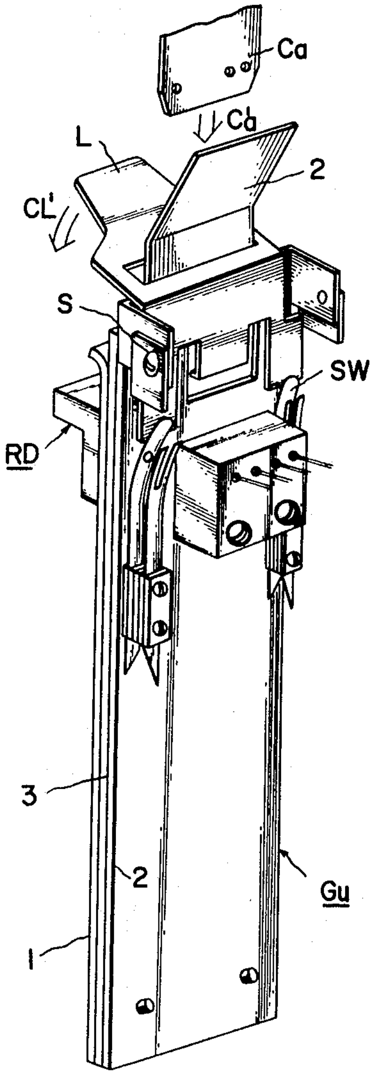
FIG·1-B
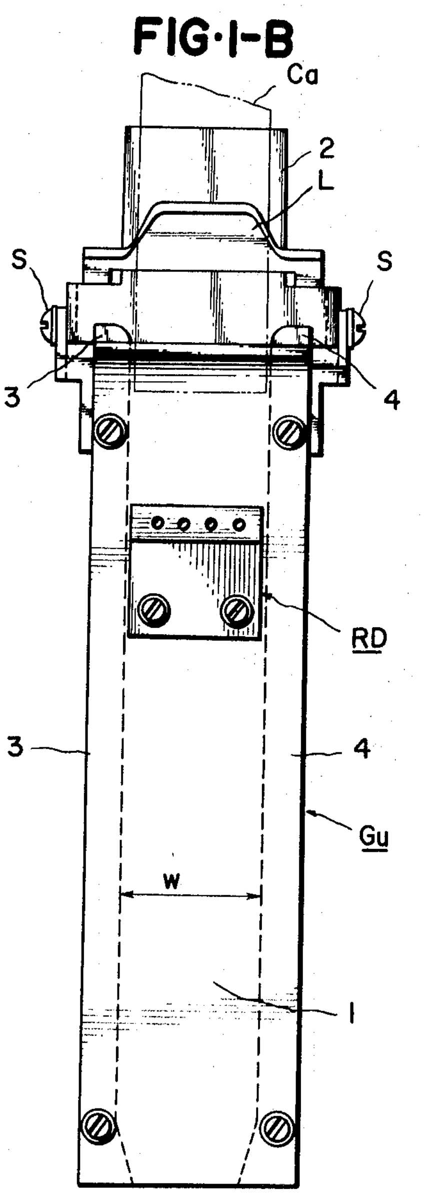

FIG. 1-C
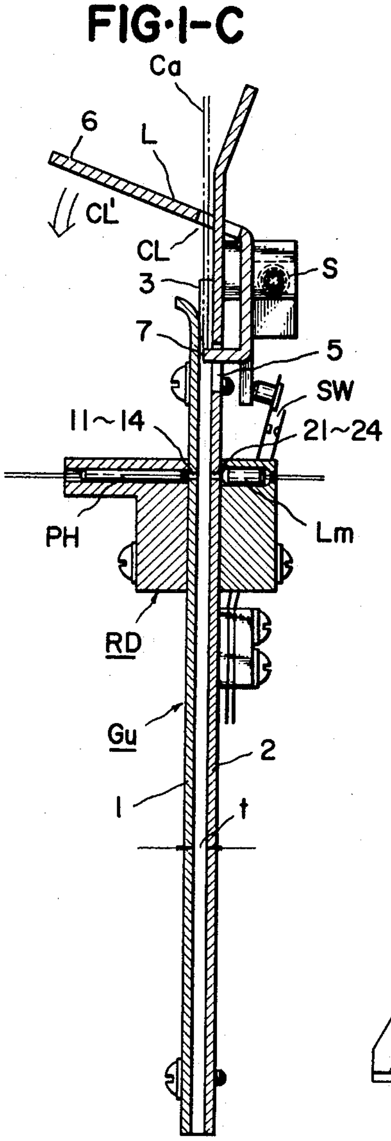
FIG. 2
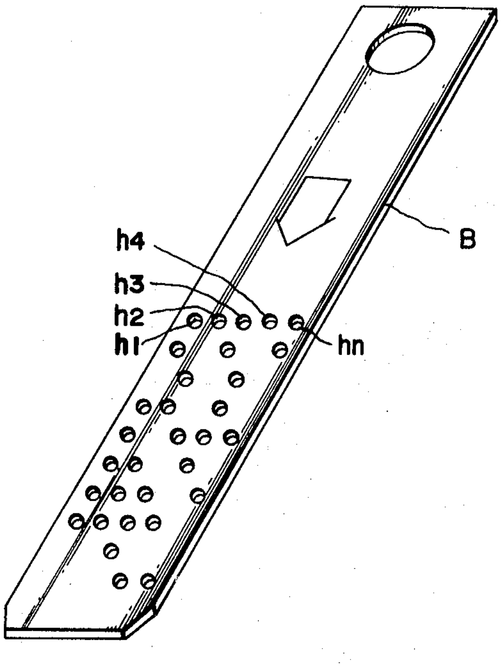

FIG·5-A
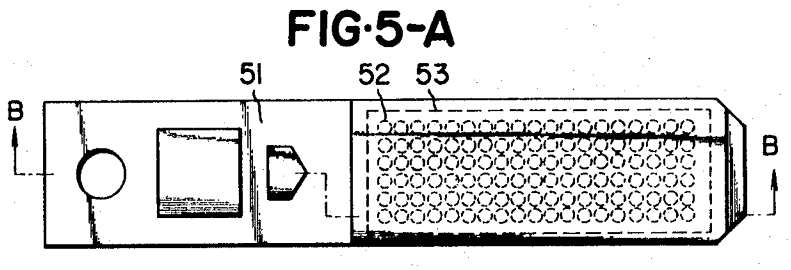
FIG·5-B
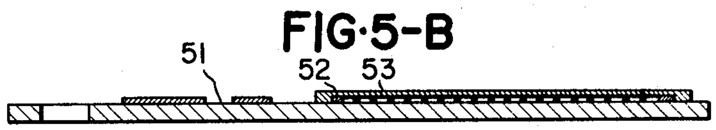
FIG·6-A
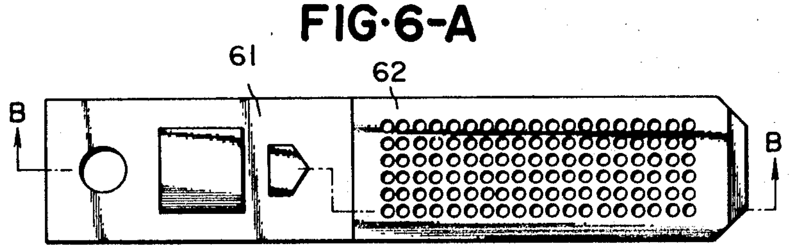
FIG·6-B
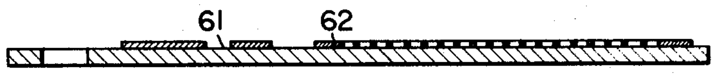

FIG. 7-A
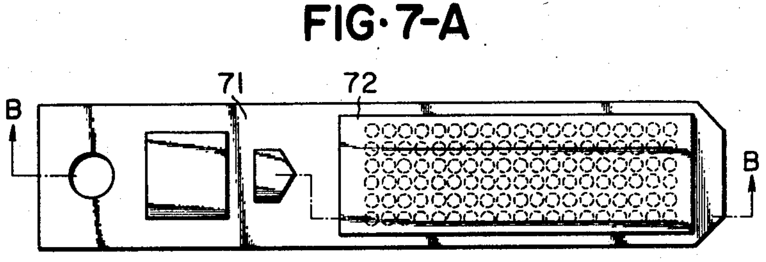
FIG. 7-B
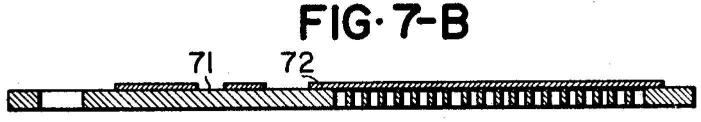
FIG. 8-A
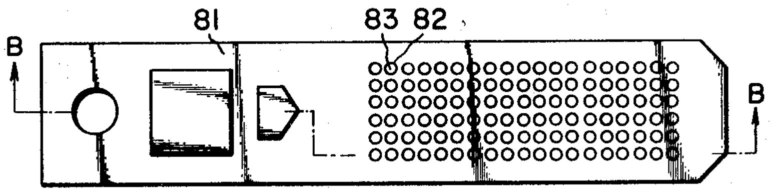
FIG. 8-B
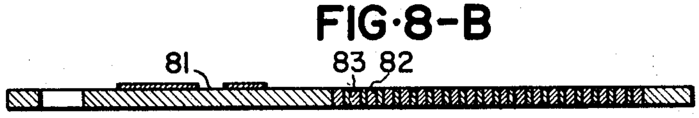
FIG. 9
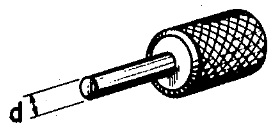

A DEVICE FOR READING PUNCHED CARDS

This invention relates to an electronic computer, and more particularly to punched cards, a data-reading device, and a synchronizing signal generator circuit usable in a compact desk-type electronic computer.

Recently, compact digital computers incorporating a program-storing device, such as a desk-type electronic computer and a digital electronic accounting machine, have been developed. In such compact digital computers, the storage capacity is usually small, and it is not necessary to read data at a high speed. Accordingly, if a known card-reading device, designed for use with large electronic computers having an elaborate card-feeding mechanism, is used in such compact digital computers, the card-reading device occupies an unduly large portion of the computer from the standpoint of cost and space, as compared with the operational portion of the digital computer.

Therefore, an object of the present invention is to obviate this problem associated with known compact digital computer systems by providing a card-reading device of simple construction adapted to feed cards by gravity. Such a reading device is particularly suitable for a compact operating device associated with a small storage capacity.

BRIEF DESCRIPTION OF THE DRAWINGS

For a better understanding of the invention, reference is made to the accompanying drawings, in which:

FIGS. 1-A to 1-C are, respectively, a perspective view, an elevation, and a sectional view, showing a card-reading device according to the present invention;

FIG. 2 is a perspective view of a punched card usable in the card-reading device, according to the present invention;

FIGS. 5-A to 8-B illustrate different punched cards, which are usable in the card-reading device, according to the present invention; and FIG. 9 is a perspective view of a handtool, which can be used advantageously in boring holes on the cards by punching.

DETAILED DESCRIPTION OF THE PREFERRED EMBODIMENTS

Figure 4:
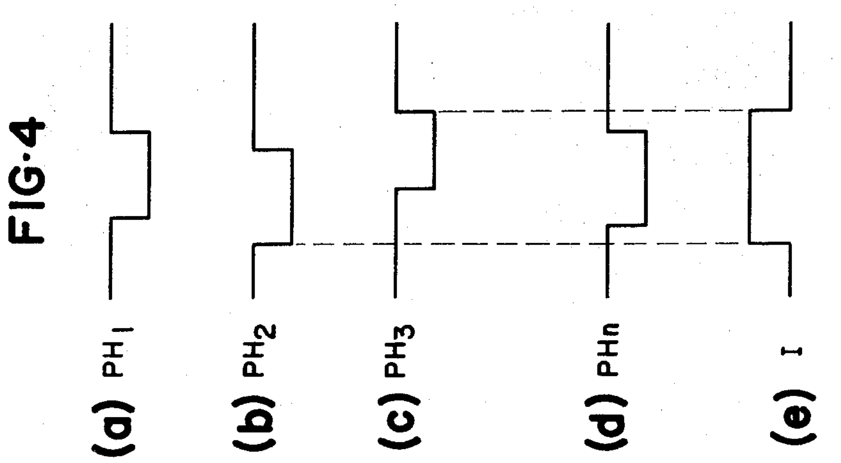
FIG. 4 is a graph showing wave shape of signals in the synchronizing signal generator circuit.

Referring to FIGS. 1-A to 1-C, a card guide mechanism, which is generally depicted by G*u*, has a card passageway of a thickness *t* and a width *w*, which is defined by a front board 1, a rear board 2, and sideplates 3 and 4. Each punched card C*a* passes through the passageway by gravity. The rear board 2 has light inlet holes 21 to 24, so as to project light beams therethrough for reading coded signals stored in the punched cards. Light-beam-detecting holes 11 to 14 are disposed on the front board 1 at positions corresponding to said light inlet holes 21 to 24, so that light beams arriving thereat through punched holes on the card can be detected at the detecting holes 11 to 14. A rectangular opening 5 is bored on the rear plate 2 at a position above the detecting holes 21 to 24, in such manner that a lock arm L can be inserted therein to prevent a punched card C*a* from entering into the passageway.

A signal reading unit RD comprises a light beam projector L*m* mounted on the rear board 2 of the card guide mechanism G*u*, so as to project light beams through the inlet openings 21 to 24, and photoelectric transducer elements PH, such as phototransistors, mounted on the front board. The number of transducer elements PH equals the number of detecting holes 11 and 14 bored through the front board 1. The number of detecting holes should be sufficiently large to represent each coded bit in each row of punched holes on the card C*a*.

A card lock unit CL has the L-shaped card lock arm L pivotally supported by fulcrums S integrally secured to the rear board 2 of the card guide mechanism G*u*. The card lock arm L of the card lock unit CL has a lower bent end portion 7, which acts as a closing arm, engageable with the rectangular opening 5 bored through the rear board 2 of the card-guiding mechanism G*u*, to block passage of a card therethrough. The closing arm 7 is normally held engaged with the rectangular hole 5 to close the card passageway thereby preventing punched cards from passing downwards therethrough. When the upper end 6 of the lock arm L is depressed, the lock arm L rotates around the fulcrum S in a counterclockwise direction, as shown by the arrow CL' in FIGS. 1-A and 1-C, so that the closing arm 7 at the lower end thereof is withdrawn from the rectangular opening 5 on the rear board 2, thereby opening passageway in the card guide mechanism. A limit switch SW is associated with the card lock arm L, in such manner that upon depression of the upper end 6 thereof, the switch SW is closed to generate a signal indicating the beginning of card-reading operation.

FIG. 2 illustrates a punched card C*a* usable in the card-reading device, as shown in FIGS. 1-A to 1-C. The punched card consists of an opaque base cardboard B of suitable thickness and proper weight. Coded data are stored on the punched card C*a* by selectively boring a hof holes $h_1$ to $h_n$ therethrough at certain positions thereof. In other words, the information is stored in accordance with the positions of the punched holes.

When prepunched card C*a* having a certain information stored therein is inserted in the upper end of the card guide mechanism G*u*, as shown in FIG. 1-A, the lower end of the card C*a* engages the upper surface of the closing arm 7 of the card lock arm L of the card lock unit CL Thus, the card C*a* is held at the upper portion of the card guide mechanism G*u*, in the state ready for reading. As the upper end 6 of the card lock arm L is depressed, the arm L turns in a counterclockwise direction, closing the the limit switch SW to generate an electric signal indicating the beginning of the reading operation. The closing arm 7, located at the lower end of the card lock arm L, is now withdrawn from the rectangular hole 5 of the rear board 2, to clear the card passageway inside the card guide mechanism G*u*. As a result the card C*a* descends through the card passageway by gravitation. While the card C*a* proceeds through the card guide mechanism G*u*, the data stored in the card C*a* can be detected, or read, by light beams injected into the card passageway from the light beam projector L*m* of the signal-reading unit RD. The light beams passing through the punched holes on the card C*a* are converted into corresponding electric signal pulses by the photoelectric transducers PH. In this manner the information is successively fed to a separate operating device, which is set to receive such information from the signal-reading unit RD.

As described above, in the card-reading device according to the present invention, each card is fed by gravity. Therefore, the card-feeding mechanism of this invention is considerably simpler than as compared with corresponding card feeding mechanisms of known card-reading devices. Accordingly, the manufacturing cost of the card-reading device disclosed herein is considerably reduced.

For these reasons the card reading device according to the present invention is particularly suitable for reading comparatively short or small amounts of information from cards and for feeding such information to a compact electronic digital computer, such as a desk-type electronic computer and a digital electronic accounting machine.

A device for reading coded signals from a punched card or a punched tape is usually provided with a synchronizing signal generator circuit. This circuit is actuated upon reading of special signal bits bored on the punched card or punched tape, to generate synchronizing signals. Such a synchronizing signal generator circuit requires extra signal bits, resulting in a complicated arrangement of punched holes on the card or tape. In addition, the synchronizing signal generator circuit itself is complex.

Therefore, another object of the present invention is to provide a simple circuit capable of generating synchronizing signals, which are in complete synchronism with the operation of reading coded signals.

Figure 3:
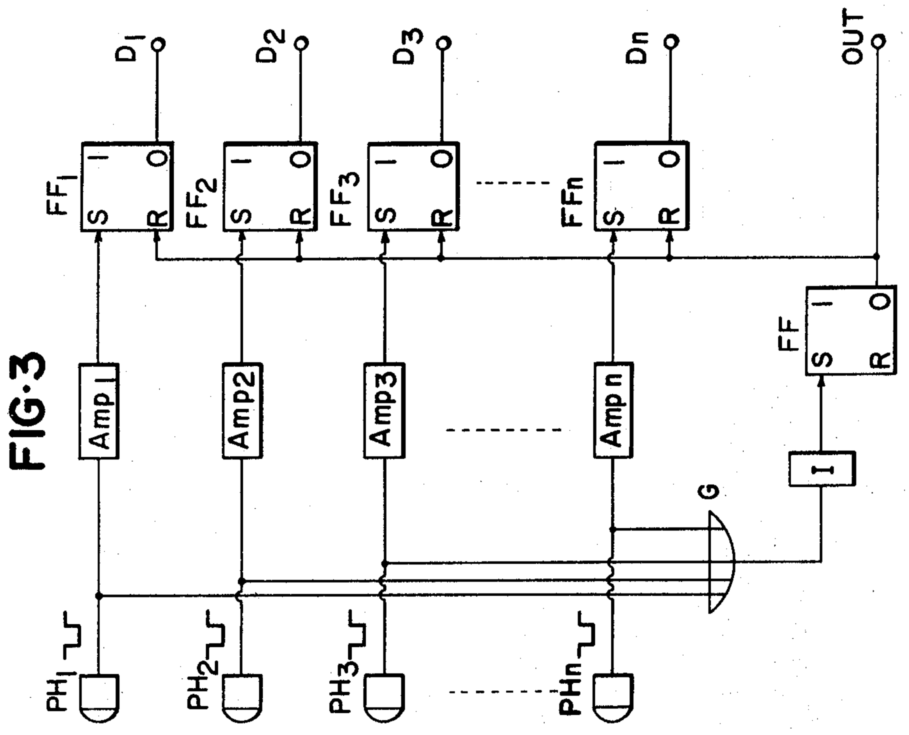
FIG. 3 is a block diagram of a synchronizing signal generator circuit, usable in conjunction with the card-reading device according to the present invention.

FIG. 3 illustrates a block diagram of a simplified synchronizing signal generator, according to the present invention. Photoelectric transducer elements $PH_1$, $PH_2$, ... $PH_n$, such as phototransistors, convert light beams each representing a bit of a coded signal in the punched card or punched tape into electric signals. Each flip-flop circuit $FF_1$, $FF_2$, ...$FF_n$ corresponds to a bit of the coded signal and temporarily holds the electric signals generated by the photoelectric transducer elements $PH_1$ to $PH_n$. The electric signals representing the coded bits are delivered to terminals $D_1$, $D_2$... $D_n$. The electric signals from the photoelectric transducer elements $PH_1$, $PH_2$, ... $PH_n$ are applied to an OR gate G. An inverter I inverts the phase of the pulse signal applied thereto from the OR gate G, and amplifies the applied signal. The synchronizing signal is delivered to an output terminal OUT.

The output terminal of each photoelectric transducer element $PH_1$ to $PH_n$ is connected to a corresponding amplifier $Amp_1$ to $Amp_n$, which is in turn connected to a corresponding flip-flop circuit $FF_1$ to $FF_n$ at the set signal input terminal thereof. The output terminals of the photoelectric transducer elements $PH_1$ to $PH_n$ are also connected to input terminals of the OR gate G. The output terminal of the OR gate G is connected to the set signal input terminal S of a flip-flop circuit FF. A reset signal output terminal 0 of the flip-flop circuit FF is connected to reset signal input terminals R of each flip-flop circuit $FF_1$ to $FF_n$, as well as to the synchronizing signal output terminal OUT. The reset signal output terminal 0 of each flip-flop circuit $FF_1$ to $FF_n$ is connected to the corresponding code signal output terminals $D_1$ to $D_n$, respectively.

The operation of the synchronizing signal generator circuit of the above construction is as follows.

Photoelectric transducers $PH_1$ to $PH_n$ detect whether or not there are punched holes at corresponding positions of a recording medium, such as a card or a tape. These positions represent bits of each signal recorded on the medium. When punched holes, representing bits constituting a particular information, pass across lines connecting the corresponding inlet and detecting holes of the card guide mechanism $Gu$, the photoelectric transducers located at such detecting holes receive light beams through the punched holes on the medium, so as to convert the light beams into electric pulse signals, as shown by curves *a* to *d* of FIG. 4. As shown in the figure, the timing of the beginning and end of each pulse signal from different photoelectric transducers $PH_1$ to $PH_n$ does not coincide with each other. This is because of the inevitable minor deviations in the alignment of punched holes and the difference in operative characteristics of each photoelectric transducer element.

The pulse signals generated by the photoelectric transducer elements are amplified by the corresponding amplifiers $Amp_1$ to $Amp_n$, and then applied to each set signal input terminal of the corresponding flip-flop circuits $FF_1$ to $FF_n$, respectively. Thus, each bit detected by the photoelectric transducer elements $PH_1$ to $PH_n$ is temporarily stored in the flip-flop circuits $FF_1$ to $FF_n$, by setting the flip-flop circuits at the end of the output pulse from the photoelectric transducer elements.

The output pulse signals from the photoelectric transducer elements $PH_1$ to $PH_n$ are also applied to input terminals of the OR gate G. The output terminal of the OR gate G is connected to the input terminal of the inverter circuit I. The output pulse from the OR gate G begins at the beginning of the earliest of the output pulses from the photoelectric transducer elements $PH_1$ to $PH_n$, and ends at the end of the last of said output signals from said photoelectric transducer elements. The inverter I inverts the phase of the output pulse from the OR gate G, so as to produce an output pulse from the inverter I, as depicted by the curve *e* of FIG. 4. The output from the inverter I is fed to the set signal input terminal S of the flip-flop circuit FF, so as to generate a synchronizing pulse at the output terminal OUT by setting the flip-flop circuit FF at the end of the signal from the inverter I.

The output signal from the flip-flop FF is applied to the reset signal input terminal of each flip-flop $FF_1$ to $FF_n$, so as to reset those flip-flop circuits which have been previously set. Thus, those flip-flop circuits which have been set by the output pulses from the photoelectric transducer elements, $PH_1$ to $PH_n$ are reset, so as to deliver pulse signals representing corresponding coded bits at output terminals $D_1$ to $D_n$.

Thus, the output signals from terminals $D_1$ to $D_n$ corresponding to constituent bits of each signal are always accurately synchronized with the synchronizing signal delivered at the synchronizing signal output terminal OUT, even when the output pulse signals from individual photoelectric transducer elements are not in synchronism with each other. In this particular embodiment, since the output signal from the OR gate G is applied to the set signal input terminal of a flip-flop circuit FF through the inverter I, all the flip-flop circuits, including $FF_1$, $FF_n$ and FF, can have identical operative characteristics. For instance, a flip-flop circuit adapted to be set by the descending edge of each input pulse thereto can be used for all the flip-flop circuits. It is also possible to use flip-flop circuits settable by the rising edge of each input pulse signal for all the flip-flop circuits of the synchronizing circuits. In the latter case, the inverter circuit I is not necessary, and the inverter I of FIG. 3 can be replaced by an amplifier.

In known synchronizing signal generators of coded-signal-reading devices, separate bits are used for generating synchronizing signals, so that synchronizing signals can be generated upon detection of such separate bits by photoelectric transducer elements. With such separate synchronizing bits, it has been difficult to bring all output signals, representing each bit of a coded signal, into synchronism. To obviate such difficulty, complicated punching machines and coded signal readers have been used, which are bulky and costly.

According to the present invention, deviation in the location of punched holes on the recording medium, such as a card or a tape, as well as deviation in the timing of pulse generation upon reading of punched holes representing information bits, which is due to disparity of operative characteristics of photoelectric transducer elements, can be compensated for by an external synchronizing circuit, so as to produce output signals in accurate synchronism with a synchronizing signal from the reading device.

Thus, with the synchronizing signal generating circuit according to the present invention, comparatively short information can be recorded by punching a recording medium, such as a card or a tape, by using a simple handtool, without relying on complicated punching machines, because certain deviation in the location of punched holes can be corrected by the synchronizing-pulse-generating circuit. Accordingly, the synchronizing-pulse-generating circuit according to the present invention is particularly suitable for compact electronic digital computer, such as electronic desk-type computer and a compact accounting machine.

Compact digital computers, such as desk-type electronic computer, have only small data storage capacity for programs and informations, and hence, it is not necessary to feed a large amount of information, as in the case of large electronic computers. For instance, only a few data cards, or often only one card, are sufficient for operation. If known cards for large electronic computers are used for such compact computers requiring only a few cards, an elaborate card-punching machine becomes indispensable, resulting in enlarged floor space and additional complication in the equipment and operation.

FIGS. 5-A and 5-B are plan view and a sectional view illustrating an embodiment of the information-storing card according to the present invention, which can be easily punched without using special punching machine. A thin opaque sheet 52 having all the holes prepunched, is adhered to a transparent base sheet 51. Suitable opaque paint 53 is applied to both the base sheet 51 and the thin sheet 52.

With the information storing card of the aforesaid construction, information can be recorded on the card simply by removing the opaque paint at the holes corresponding to each bit representing the information to be recorded. The paint can be removed by using chemicals or a simple tool.

FIGS. 6-A and 6-B show another embodiment of the information-storing card, according to the present invention, in a plan view and a sectional view, respectively. A transparent base sheet 61, similar to the transparent sheet 51 of the preceding embodiment, carries an opaque thin sheet or an opaque paint film 62 applied thereon. The opaque sheet or film has all the holes prepunched, as in the case of the preceding embodiment. In this case, the desired information can be easily recorded on the card by applying the opaque paint at those positions which correspond to the bits representing the coded signals of the desired information.

As described in the foregoing, in the aforesaid two embodiments of the information-storing card according to the present invention, an opaque sheet or film having all the holes prepunched, which are usable for representing bits constituting coded signals of any information to be stored, is applied to a transparent base sheet, so that those positions of the transparent base sheet, which correspond to the bits of the information to be stored, can be made either transparent or opaque by applying opaque paint thereon or keeping them transparent. In practice, to keep the base sheet transparent, the entire information storing portion of the base sheet is once covered by opaque paint and then holes are bored therethrough at the positions representing bits constituting the information to be stored.

Thus, any desired information, such as data or program, can be easily stored without using any complicated punching machine, simply by selectively applying opaque paint or selectively removing the opaque paint preapplied on the base plate. Accordingly, such cards are particularly suitable for the use as input cards in compact electronic digital computers having a small storage capacity.

FIGS. 7-A and 7-B are, respectively, a plan view and a sectional view of another embodiment of the information-storing card, according to the present invention. In this embodiment, a base sheet 71 is made of opaque material and has rows of holes prepunched, for instance six punched holes a row. Each row of punched holes is usable to represent a bit of signal constituting a part of the coded information to be stored. A thin opaque film 72 is applied on the base sheet 71 so as to cover the entire span of the punched portion thereof. In a preferred embodiment, the film 72 is made of a thin aluminum foil, so that holes can be bored therethrough at positions corresponding to the prepunched holes of the base sheet 71 with a corresponding diameter *d*. A simple handtool having a sharpened rod of radius *d*, as shown in FIG. 9, can be advantageously used for boring such holes through the film 72.

With the card, as shown in FIGS. 7-A and 7-B, any desired information can be easily stored on it by boring the opaque film 72, with the simple handtool as shown in FIG. 9, so as to represent each coded bit of said information.

FIGS. 8-A and 8-B are, respectively, a plan view and a sectional view of an embodiment of the punch card, according to the present invention. An opaque base sheet 81 has rows of holes 82, which can represent coded bits of each information to be stored therein. Suitable filler material 83 is then placed in each hole 82. The handtool of FIG. 9 can be also used to remove the filler 83 filled in the holes 82 of this embodiment, so as to record the coded bits in the form of punched holes as a combination of the position of punched holes.

As described in the foregoing, with the last two embodiments of the card according to the present invention, the holes prepunched on the opaque base plate are filled with easily removable fillers made of material impervious to light. Thus, such card can be easily punched to record information without using any complicated punching machine. Instead, a very simple handtool can be used. Accordingly, such cards are particularly suitable for the use in a compact electronic computer having a small storage capacity.

What is claimed is:

1. A synchronizing signal generator which compensates for deviations in a series of electric signals representing coded bits of information contained in a row or column of an information storing medium and variations in the electrical properties of a plurality of photoelectric transducer elements so as to be able to read said series of electric signals in synchronism with a synchronizing signal produced by a synchronizing means, comprising:

a. a plurality of photoelectric transducer means for producing a series of electrical output signal pulses representing coded bits of information in response to light beams arriving thereto through punched holes on an information-storing medium;

b. a plurality of storage means, coupled to said plurality of transducer means, for storing said output signal pulses;

c. output terminal means coupled to each of said plurality of storage means;

d. an OR gate coupled to said plurality of transducer means, for receiving all of said output signal pulses;

e. a synchronizing-pulse-producing means coupled to said plurality of storage means and OR gate;

f. means responsive to the trailing edge of the last of said series of output pulse signals for simultaneously causing said synchronizing-pulse-producing means to produce a synchronizing pulse signal and transferring said stored series of output signals to said output terminal means.

2. The synchronizing signal generator of claim 1 wherein said plurality of storage means and said synchronizing-pulse-producing means comprise flip-flops.

3. The synchronizing signal generator of claim 2, wherein said plurality of photoelectric transducer means are coupled to the set sides of said plurality of storage flip-flops, said OR gate is coupled to the set side of said synchronizing flip-flop, and the output of the reset side of said synchronizing flip-flop is coupled to the inputs of the reset sides of said storage flip-flops and to a synchronizing pulse output terminal whereby, the trailing edge of the last of said series of output pulse signals resets said synchronizing flip-flop to simultaneously produce a synchronizing pulse on said synchronizing pulse output terminal and reset said storage flip-flops to generate said series of output pulses on said output terminal means.